US006168712B1

(12) United States Patent
Kubo et al.

(10) Patent No.: US 6,168,712 B1
(45) Date of Patent: Jan. 2, 2001

(54) APPARATUS FOR THE BIOLOGICAL TREATMENT OF WASTE FLUID FROM THE COATING PROCESS

(75) Inventors: Kimito Kubo, Kashihara; Masaaki Hamada, Kyoto; Taizo Okazaki, Kochi, all of (JP)

(73) Assignees: Kenko Sangyo Co., Ltd., Kashihara; Issei Co., Ltd., Kyoto, both of (JP)

(*) Notice: Under 35 U.S.C. 154(b), the term of this patent shall be extended for 0 days.

(21) Appl. No.: 09/301,976

(22) Filed: Apr. 29, 1999

(30) Foreign Application Priority Data

May 6, 1998 (JP) ................................. 10-139164
Nov. 12, 1998 (JP) ................................. 10-321167

(51) Int. Cl.[7] ........................................... C02F 3/06
(52) U.S. Cl. .................... 210/151; 210/167; 210/175; 210/195.1; 210/196; 210/617
(58) Field of Search ................... 210/150, 151, 210/167, 195.1, 196, 175, 612, 616, 622, 617

(56) References Cited

U.S. PATENT DOCUMENTS

| | | | |
|---|---|---|---|
| 3,341,016 | * 9/1967 | Paasche | 210/167 |
| 3,730,883 | * 5/1973 | LeFrancois | 210/612 |
| 3,770,624 | * 11/1973 | McKibben et al. | 210/196 |
| 3,824,186 | * 7/1974 | Erickson et al. | 210/612 |
| 3,923,658 | * 12/1975 | Lancaster | 210/167 |
| 4,415,454 | * 11/1983 | Fuchs | 210/150 |
| 5,160,040 | * 11/1992 | Odawara et al. | 210/196 |
| 5,160,620 | * 11/1992 | Lygrn | 210/151 |
| 5,174,898 | * 12/1992 | Stuckmann et al. | 210/622 |
| 5,401,400 | * 3/1995 | Tonelli et al. | 210/151 |
| 5,480,537 | * 1/1996 | Yamasaki et al. | 210/151 |
| 5,578,202 | * 11/1996 | Hirano | 210/151 |
| 5,702,594 | * 12/1997 | Yamasaki et al. | 210/151 |
| 5,707,514 | * 1/1998 | Yamasaki et al. | 210/617 |
| 5,993,659 | * 11/1999 | Schenk et al. | 210/151 |
| 6,015,490 | * 1/2000 | Katsukura et al. | 210/151 |

* cited by examiner

Primary Examiner—Christopher Upton
(74) Attorney, Agent, or Firm—Cooper & Dunham LLP; Donald S. Dowden

(57) ABSTRACT

An apparatus for the biological treatment of waste fluid from the coating process is presented in the present invention. Said apparatus comprises a biological treatment vessel filled with carriers immobilizing microorganism useful for the treatment of waste fluid from the coating process, a tank in which said biological treatment vessel is set, a heating means to heat said waste fluid in said tank, a stirrer to stir said waste fluid, an aeration means to blow air into said waste fluid, a filter for filtration of said waste fluid having been treated, and a return pass to return filtrate of said waste fluid to said tank.

8 Claims, 6 Drawing Sheets

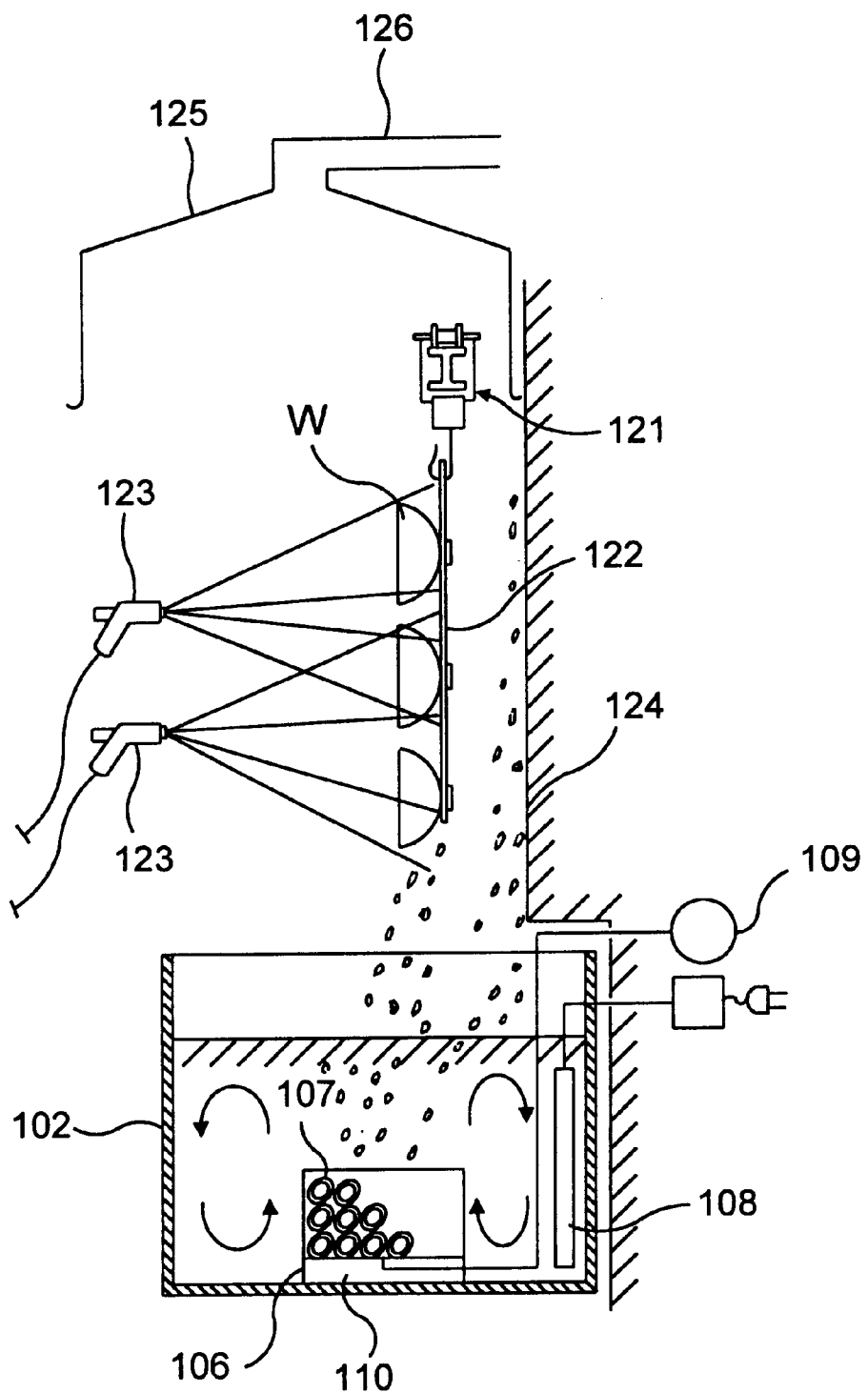
F I G. 2

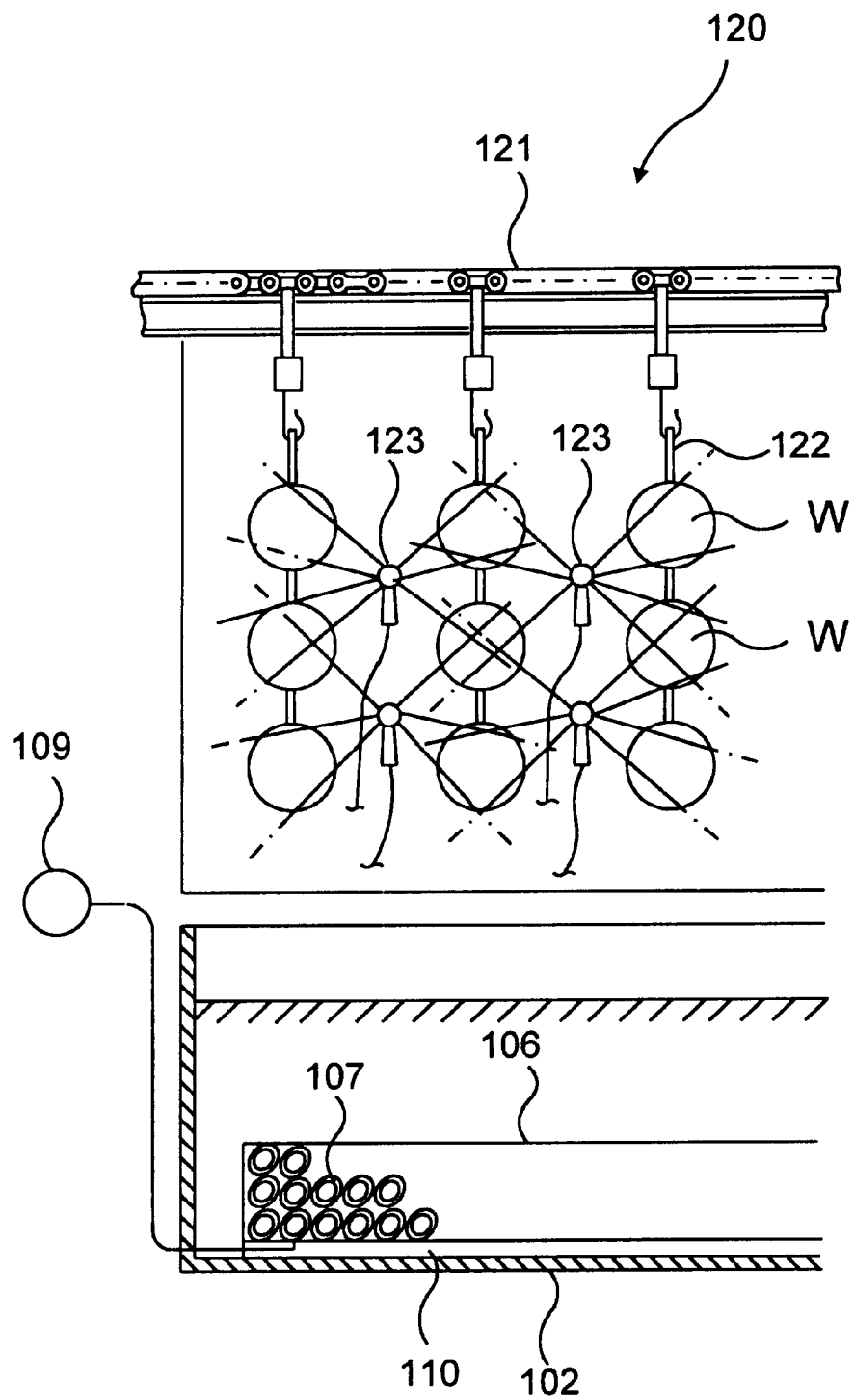
F I G. 3

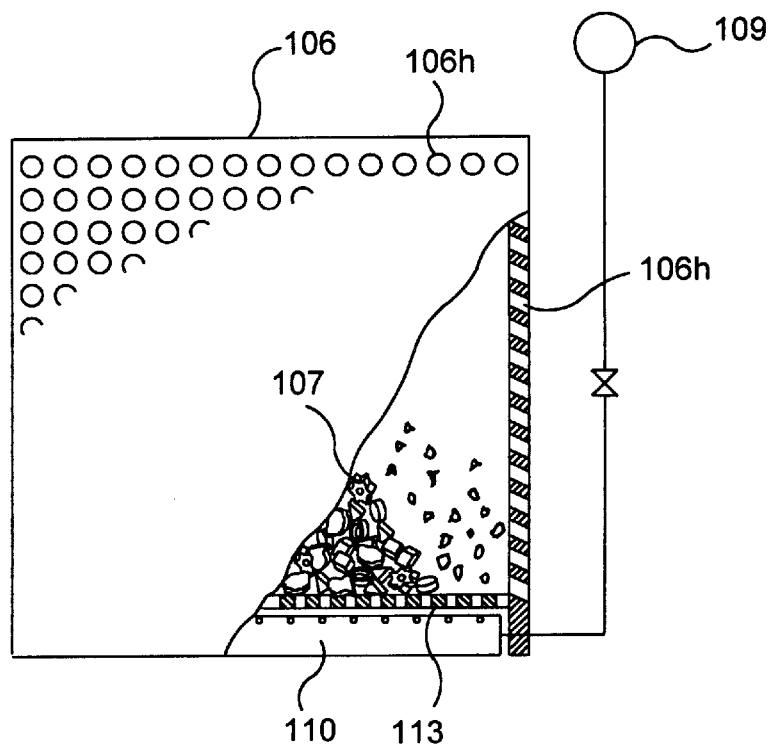
F I G. 4
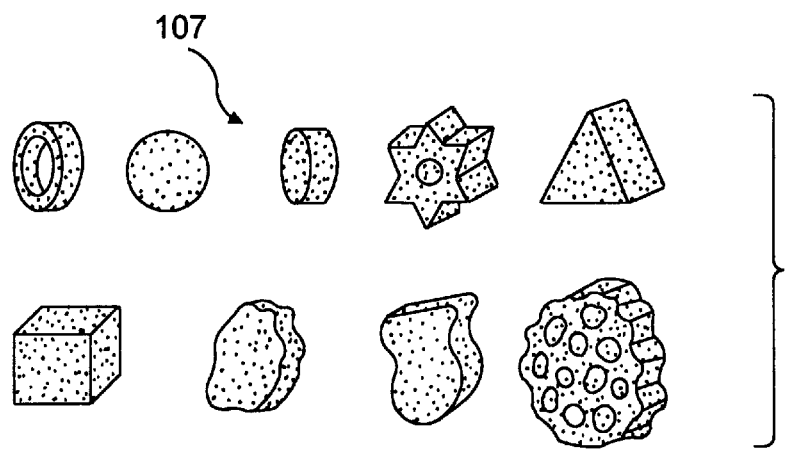
F I G. 5

APPARATUS FOR THE BIOLOGICAL TREATMENT OF WASTE FLUID FROM THE COATING PROCESS

FIELD OF THE INVENTION

The present invention relates to an apparatus for the biological treatment of waste fluid from the coating process.

More particularly, the present invention relates to an apparatus for the biological treatment of waste fluid from the coating process comprising: a biological treatment vessel filled with carriers immobilizing microorganism useful for the treatment of waste fluid from the coating process, a tank in which said biological treatment vessel is set, a heating means to heat said waste fluid in said tank, an aeration means to blow air into said waste fluid, a filter for filtration of said waste fluid having been treated, and a return pass to return filtrate of said waste fluid to said tank.

DESCRIPTION OF THE PRIOR ART

In the coating process, waste fluid containing paint is generated. Hitherto said waste fluid is collected in a tank and an alkaline agent is added to said waste fluid to neutralize and form sediment. Said sediment is separated from said treated waste fluid and said separated sediment is usually treated by reclaiming, dehydration and combustion and the like.

Said tank should be periodically washed by workers, nevertheless awfully bad smell is generated from said tank and said washing work must be done in very bad environment.

Further, some contaminating materials from paint in said waste fluid such as solvents, resins and the like are difficult to be settled completely and remain in said treated waste fluid.

Still further, it is difficult to separate said sediment completely from said treated waste fluid and small pieces of said sediment remain in said treated waste fluid.

SUMMARY OF THE INVENTION

Accordingly, an object of the present invention is to present an apparatus which treats waste fluid from the coating process and solves the problem of bad smell from the tank treating said waste fluid.

A further object of the present invention is to present an apparatus which treats waste fluid from the coating process which can remove contaminating material substantially completely from said waste fluid.

BRIEF DESCRIPTION OF THE DRAWINGS

FIG. 1 to FIG. 5 relate to an embodiment of the present invention.

FIG. 1 is a schematic plan showing an apparatus of said embodiment.

FIG. 2 is a side sectional view of a coating part.

FIG. 3 is a front sectional view of a coating part.

FIG. 4 is a front view partially sectioned.

FIG. 5 shows some examples of carrier shape.

FIG. 6 is a side sectional view of the coating part with the coating booth.

FIG. 7 is a front sectional view of the coating booth.

DETAILED DESCRIPTION

Figure 1:
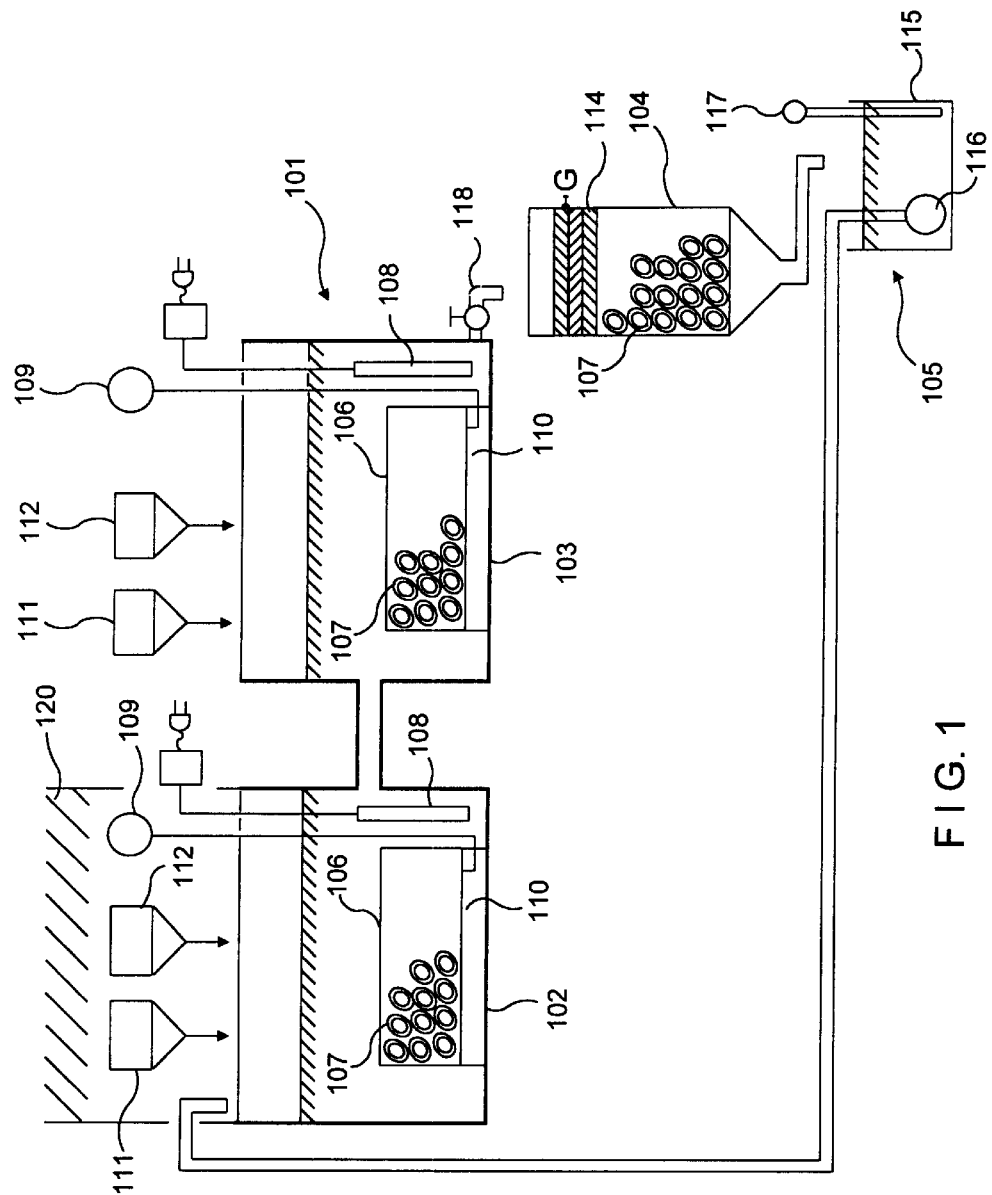

Referring now to FIGS. 1 to 5, an apparatus (101) of the present invention is used for the biological treatment of waste fluid exhausted from a coating part (120) shown in FIGS. 2 and 3. In said coating part (120), workpiece W to be coated is hung by hanger (122) of a chain conveyer (121) to transport and paint is sprayed on said workpiece W by using spray guns (123) to coat said workpiece W with said paint. In said coating part (120), excessive paint sprayed from said spray gun (123) is effectively collected by a screen wall (124) and paint mist wafting in said coating part (120) is collected in a ventilation duct (126) through a hood (125).

Waste paint flowing down on said screen wall (124) and said paint mist sucked in said ventilation duct (126) are led into said apparatus (101) as waste fluid.

Said apparatus (101) is set in the under-side of said coating part (120) and consists of the first treating tank (102) receiving waste fluid from said coating part (120), the second treating tank (103) for secondary treatment of said waste fluid to which the first treatment is effected in said first treating tank (102), a filter tank (104) for filtration of said waste fluid having been treated in said second treating tank (103), and a return pass (105) to return filtrate of said waste fluid to said first treating tank (102).

A biological treatment vessel (106) filled with carriers (107) immobilizing microorganism is set in each treating tank (102, 103) and a heater (108) with a thermostat and an aeration pipe (110) to blow air from an air pump (109 into waste fluid are inserted in each treating tank (102, 103).

Further, a feeder (111) to supply inactivated microorganism immobilized in, such as, diatomaceous earth, flour, rice bran, carbide powder and the like in said waste fluid in each treating tank (102, 103), and a feeder (112) to supply nutriments for said microorganisms such as powder type fertilizer, fluid type fertilizer, hyponecs powder on the market, crude sugar powder and the like in said waste fluid in each treating tank (102, 103) are respectively arranged in each treating tank (102, 103). Said nutriments are selected according to the amount of solvent contained in paint and kind of said microorganism and said feeder (112, 113) is such as screw feeder, belt feeder, vibration feeder, qualitative measure tool and the like.

Said biological treatment vessel (106) has a vessel body having a plural number of holes (106h) as shown in FIG. 4 and said vessel body has a shape corresponding to each treating tank (102, 103).

A perforated supporting plate (113) such as net, punching plate and the like is arranged in the lower part of said vessel (106) and said aeration pipe (110) is arranged under-side of said plate (113).

Said carrier (107) is made of such as porous ceramics, foamed plastics, active carbon, zeolite, fibrous material and the like. Said fibrous material is such as non-woven fabric and the like. Said porous ceramics is made of ceramics such as alumina, titania, silica, silicon carbide, zirconia and the like, and silicate, iron oxide, potassium oxide, magnesium oxide, calcium oxide, manganese dioxide, natrium oxide, silica sand, silas balloon, feldspar, clay and the like is desirably mixed in said ceramics. Said carrier (107) has many kinds of shapes as shown in FIG. 5 and desirable bubble ratio of said carrier is in the range between 5 to 75%.

In a case where foamed plastic or fibrous material is used as carrier, it is desirable to mix iron oxide, titanium oxide, magnesium oxide, potassium oxide, calcium oxide and the like to promote the propagation of microorganism immobilized on said carrier. Microorganism immobilized on said carrier is selected so that said microorganism can decompose material so paint such as oils and fats, organic solvents, emulsifiers, vehicle resins, pigments, dyestuffs and the like.

Said microorganism may be such as Flavobacterium species, Pseudomonas species, Acinobacter species, MethanoCoccus species, MicroCoccus species, Bacterium species, Mycobacterium species, Achromobacter species and Aeromonas species.

It is desirable to select porous carrier having specific gravity smaller than that of said waste fluid. Said porous carrier is such as foamed plastics, fibrous material and said porous carrier wafts in said waste fluid when said waste fluid is stirred by aeration in said vessel (106) to contact closely with contamination and as a result, the effectiveness of the treatment of said waste fluid is increased.

Said filter tank (104) has a filter (114) consisting of such as non-woven fabric, resin film and the like, and carrier (107) immobilizing microorganism, the same as a carrier (107) is vessel (106), is packed under said filter (114).

Treated waste fluid from said second treating tank (103) is fed into said filter tank (104) and said waste fluid is filtered by said filter (114) to remove sediment in said waste fluid and filtrate passing through said filter (114) is re-treated with said carrier (107).

Said return pass (105) has a stock tank (115) receiving said filtrate exhausted from said filter tank (104), a return pump (116) returning filtrate in said stock tank (115) to said first treating tank (102), and a level sensor (117) to detect the level of said filtrate in said stock tank (115) and when said level sensor detects that said filtrate has reached a fixed level, then said return pump (116) is operated automatically to return said filtrate to said first treating tank (102).

Said return pump (116) may be set in the outside of said stock tank (115) to use said pump (116) to supply city water or under ground water to said waste fluid to return said filtrate to said first treating tank (102).

How to use said apparatus (101) is explained as follows:

Said waste fluid in said first treating tank (102) and said second treating tank (103) is heated by said heater (108) at a temperature between 25 to 50° C., preferably 38 to 42° C. and at the same time said air pump (109) is operated to blow air from said aeration pipe (110) to stir said waste fluid in said first and second treating tanks (102, 103) and further nutriments are supplied from said feeder (112) in each treating tank (102, 103) and if necessary, microorganism is supplied from said feeder (111) to propagate microorganism in a high density. Waste paint flowing down along said screen wall (124) of said coating part (120) and paint mist dropping in said coating part (120) and paint mist sucked in said ventilation duct (126) are fed into said first treating tank (102) as waste fluid and contaminations such as organic solvents, vehicle resins, pigments, dyestuffs and the like in said paint are decomposed by microorganism immobilized on the carrier (107) in said vessel (106) and sediments containing lower fatty acids, microorganism colonies, inorganic pigments and the like are formed in said waste fluid and said sediments gradually grow by aeration. As above described, when at least a part of carrier (107) is wafting in said waste fluid, treating effectiveness may be increased.

Treated waste fluid in said first treating tank (102) is then sent to said second treating tank (103) and said waste fluid is further treated by said microorganism in said second treating tank (103) and when said sediments in said waste fluid further grow, a valve (118) is opened to send said waste fluid to said filter tank (104).

In said filter tank (104), said sediments G containing lower fatty acids, microorganism colonies, inorganic pigments and the like are removed by said filter (114) and fine sediments passing through said filter (114) and contaminating said filtrate are further treated with a carrier (107) under said filter (114) and after that, said filtrate is returned to said first treating tank (102) by operating said return pump (116).

Sediment G removed from said waste fluid is treated by such as burning treatment and the like. In the above mentioned treatment process, the worker's hard work such as cleaning using a scoop is eliminated and further wasteful operations such as 24-hour operation of the centrifugal separator to separate sediments from waste fluid and the like are also eliminated.

Figure 6:
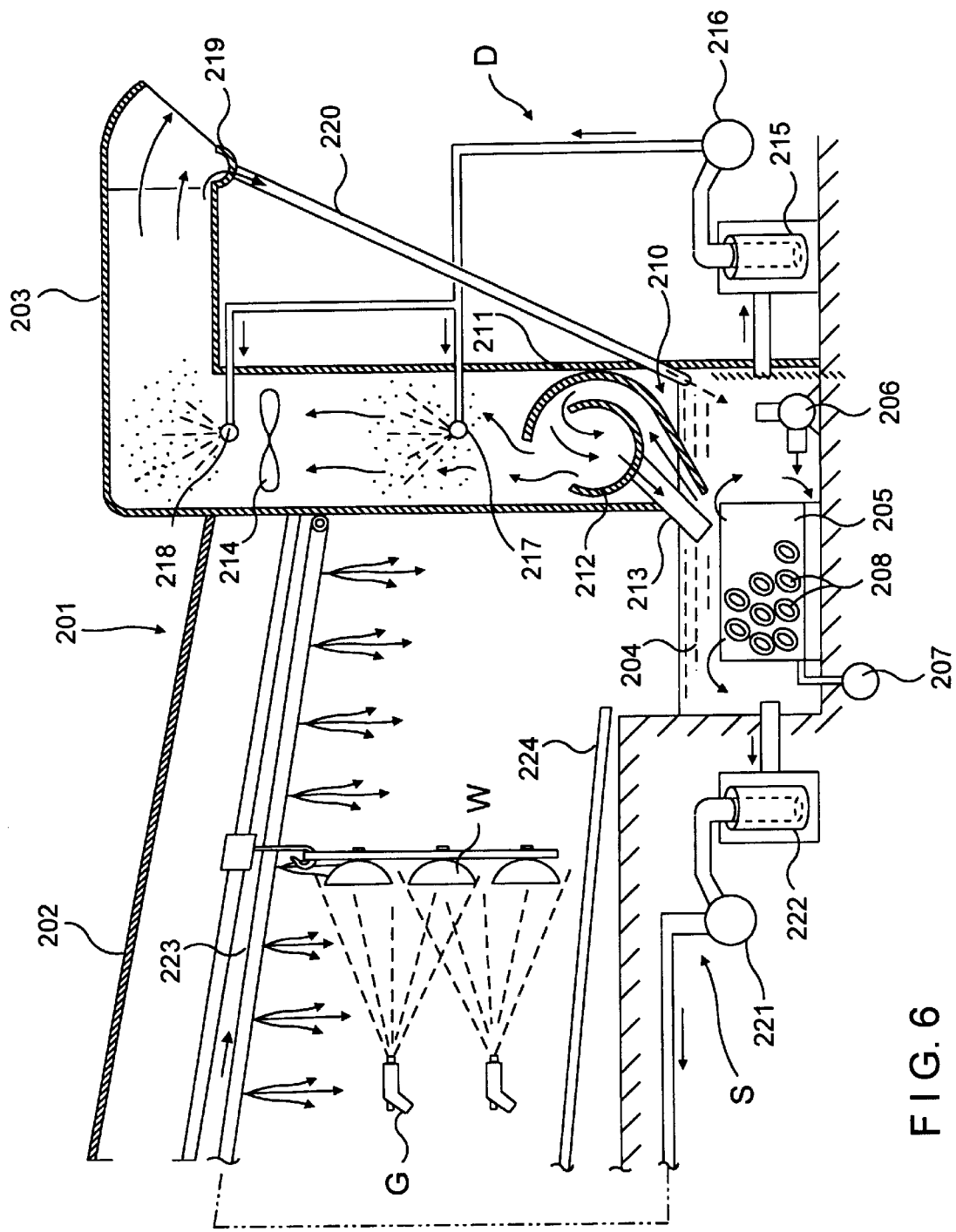
FIG. 6 and FIG. 7 relate to the other embodiment of the present invention.

In the present invention, said apparatus having a single treating tank (102A) as shown in FIG. 6 is also presented and plural number of said treating tanks may be arranged in parallel, and further, a stirrer in addition to aeration means can be provided in each tank. Further, said carrier (107) under the filter (114) in said filter tank (104) is not always necessary in the present invention so that said carrier (107) can be omitted.

Figure 7:
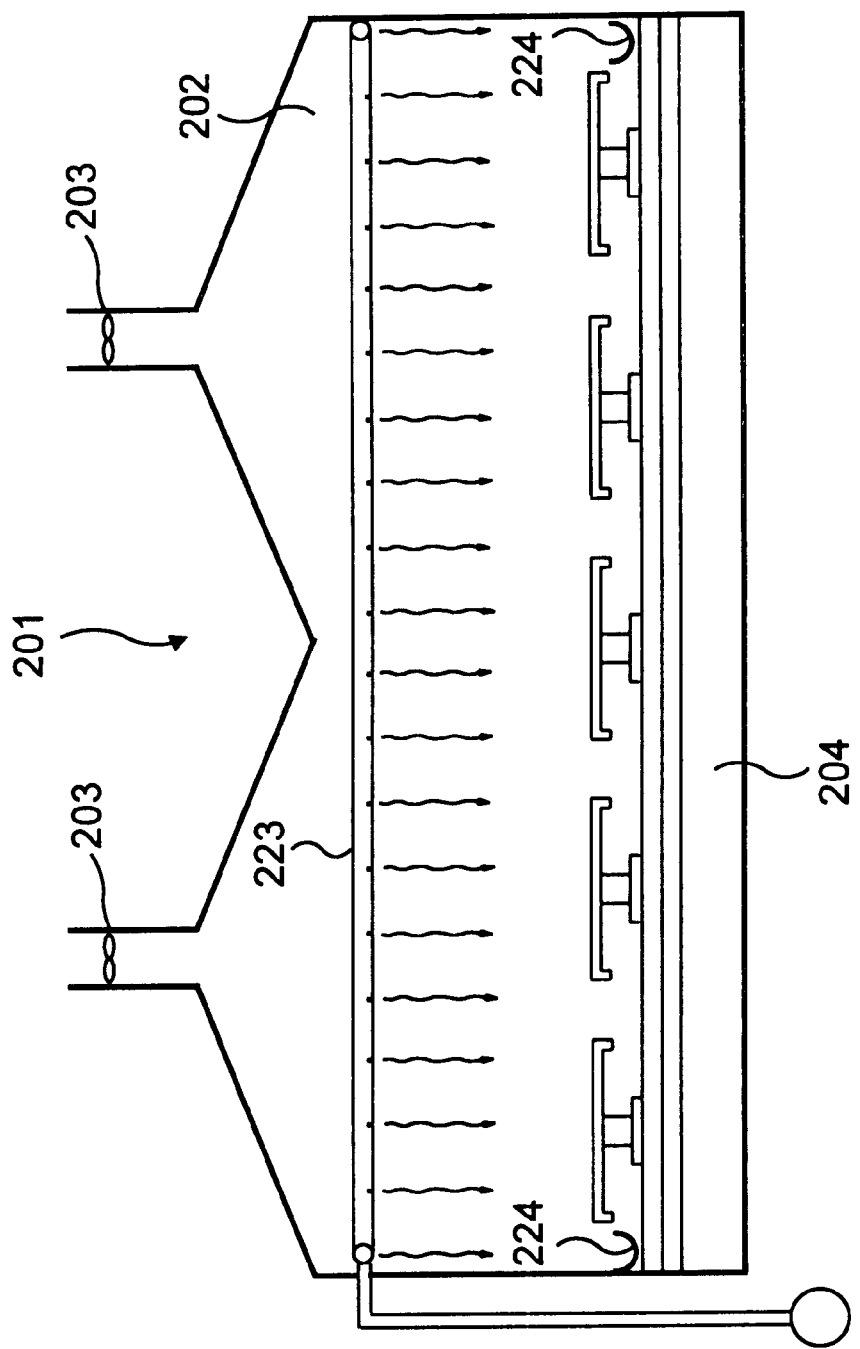

FIG. 6 and FIG. 7 relate to another embodiment of the present invention.

Referring now to figures, a coating booth (201) has a coating chamber (202) and an exhausting duct (203) and a treating tank (204) in which water can be supplied is set in said treating tank (204). In said treating tank (204), a biological treatment vessel (205), an under water pump (206), an air pump (207), a heater (which is not described in figures) and the like are equipped and microorganism can be propagated in said vessel (205). Namely, in said vessel (205), a carrier (208), the same as the carrier (107) in the prior embodiment is contained and said microorganism can decompose materials of paint such as oils and fats, organic solvents, emulsifires, vehicle resins, pigments, dyestuffs and the like immobilized on said carrier (208).

In said treating tank (204), waste fluid from the coating process is heated by the heater at a temperature between 38 to 42° C. and air is blown into said waste fluid by operating said air pump (207) and said under water pump (206).

Above said treating tank (204), a feeder to supply inactivated microorganism immobilized such as diatomaceous earth, flour, rice bran, carbide powder and the like in said waste fluid in said treating tank (204) and a feeder to supply nutriments for said microorganism such as powder type fertilizer, fluid type fertilizer, hyponecs powder on the market, crude sugar and the like in said waste fluid in said treating tank (204) are arranged to propagate said microorganism in a high density, the same as in the prior embodiment.

In said coating chamber (202), paint is sprayed by spray gun G to workpiece W to be coated and waste paint as waste fluid is collected and fed into said treating tank (205). In said treating tank (204), contaminations such as organic solvents, vehicle resins, pigments and the like are decomposed by said microorganism and become sediments and said sediments have almost no smell and are easily separated. For instance, in the case of the traditional method wherein a neutralization agent such as sodium hydroxide is added to said waste fluid in the treating tank, 433 kgs of viscous and bad smelling sediments are produced in two months but in this embodiment, 128 kgs (about ⅓) of non-viscous sediments without bad smell are produced in two months.

In this embodiment, treated waste fluid in said treating tank (204) is used as cleaning fluid to remove paint refuse adhering to the inner wall of said exhausting dust (203), paint mist wafting in said exhausting duct (203) and paint refuse adhering to the inner wall of said coating chamber (202) so that duct cleaning means D to wash said exhausting duct (203) and chamber cleaning means S to was the inner wall of said coating chamber (202) are equipped.

Namely, an arched guide (211) and a cyclone separator (210) having a conduit (212) and a return pipe (213) are arranged in the lower end part of said exhausting duct (203) and further a fan (214) is arranged in the upper part of said exhausting duct (203) to such air containing paint mist and a part of said treated waste fluid to product revolution flow to collect and withdraw said paint mist and exhausting gas is discharged from said exhausting duct (203) to the outside. Nevertheless, a little amount of paint mist still remains in said exhausting gas which passed through said cyclone separator (210) and said remaining paint mist may adhere to the inner wall of said exhausting duct (203) and said fan (214) to product turbulence of air flow in said coating chamber (202) to obstruct smooth separation of paint mist by said cyclon separator (210).

To solve this problem, paint refuse and paint mist in said exhausting duct (203) are removed by said duct cleaning means D to avoid the production of said turbulence of air flow and leak of paint mist to the outside.

Said duct cleaning means D provides a suction pump (216) to suck treated waste fluid in said treating tank (204), a filter (215), a spraying means (217) spraying filtered waste fluid to the inside of said exhausting duct (203) and a spraying means (218) spraying filtered waste fluid to the inside wall of said exhausting duct (203) and if necessary, a receiving conduit (219) and a receiving pipe (220) are arranged at opening of said exhausting duct (203). Treated fluid in said treating tank (204) is sucked by said suction pump (216) and filtered through said filter (215) and then sprayed from said spraying means (217) to catch paint mist wafting in said exhausting duct (203). Said sprayed waste fluid containing said paint mist may drop to said treating tank (204) to be treated by microorganism.

Further paint refuse adhering to the inside wall of said exhausting duct (203) is removed from said inside wall of said exhausting duct (203) by said sprayed waste fluid to drop directly or flow down through said receiving conduit (219) and said receiving pipe (220) to said treating tank (204) to be treated by microorganism.

Said chamber cleaning means S provides a suction pump (221) to suck said treated waste fluid, a filter (222) to filter said waste fluid, and an exhausting pipe (223) through which filtered waste fluid flows down along the inside wall of said coating chamber (202) and a conduit (224) to receive said waste fluid flowing down along the inside wall of said coating chamber (202) and return said waste fluid to said treating tank (204).

Paint refuse adhering to the inside wall of said coating chamber (202) is removed from the inside wall of said coating chamber (202) by said waste fluid flowing down from said exhausting pipe (223) to be received by said conduit (224) and returned to said treating tank (204) for treatment with microorganism. In said coating booth (201), workpiece W to be coated is coated by paint sprayed by said spray gun G and produced paint mist in said coating chamber (202) is fed into said treating tank (204) for treatment with microorganism. Accordingly, no turbulence of air is produced by clogging of said exhausting duct (204) to prevent coating unevenness and problems of smell of solvents and paint mist leak from said exhausting duct (203) are effectively solved.

Further, when said waste fluid flows down along the inside wall of said coating chamber (202) from said exhausting pipe (223) of said chamber cleaning means S, said waste fluid removes paint refuse from the inside wall of said coating chamber (202) to return it to said treating tank (204) for treatment with microorganism, thus said coating chamber (202) is kept clean and good work environment can be maintained. Said chamber cleaning means S and said duct cleaning means D can be operated continuously or intermittently.

As above described, paint mist is caught and paint refuse adhering to the inside wall is removed by circulation of said treated waste fluid in said treating tank (204) so that said waste fluid containing said paint mist and paint refuse can be returned to said treating tank (204) for the treatment with microorganism and in this case, the high density of microorganism is maintained in said treating tank (204) and decomposition of contamination in said waste fluid can be effectively carried out.

In the present invention, said cyclone separator (210) is not always necessary. Further it is not necessary to provide both spraying means (217) and spraying means (218) and in the present invention, only one spraying means, spraying means (217) or spraying means (218) can be provided.

We claim:

1. An apparatus for the biological treatment of waste fluid from a coating process comprising: a biological treatment vessel filled with carriers immobilizing a microorganism useful for the treatment of waste fluid from the coating process, a tank in which said biological treatment vessel is set, a heating means to heat said waste fluid in said tank, a stirrer to stir said waste fluid, and aeration means to blow air into said waste fluid, said aeration means being arranged at the bottom of said biological treatment vessel, a filter for filtration of said waste fluid, and a return pass to return filtrate of said waste fluid to said tank.

2. An apparatus in accordance with claim 1 wherein said microorganism can decompose components contained in paint.

3. An apparatus in accordance with claim 1 wherein said carrier is selected from a group consisting of porous ceramics, foamed plastics, active carbon, zeolite and fibrous material.

4. An apparatus in accordance with claim 1 wherein at least a part of said carrier consists of a porous material having a specific gravity smaller than that of said waste fluid.

5. An apparatus in accordance with claim 1 wherein a plural number of said tanks are arranged in series or in parallel.

6. An apparatus in accordance with claim 1 wherein said apparatus is set in a coating booth having a ventilation duct.

7. An apparatus in accordance with claim 6 wherein said filtrate from said filter of said apparatus is sprayed in said ventilation duct to catch paint mist wafting in said ventilation duct and remove paint refuse adhering to the inner wall of said ventilation duct so that said paint is withdrawn to said tank.

8. An apparatus in accordance with claim 6 wherein said filtrate flows down along the inner wall of said ventilation duct to remove paint attaching to the inner wall of said ventilation duct so that said paint is withdrawn to said tank.

* * * * *